United States Patent [19]

Pankoke

[11] Patent Number: 5,038,593
[45] Date of Patent: Aug. 13, 1991

[54] METHOD OF AND APPARATUS FOR TEXTURIZING WORKPIECES

[75] Inventor: Christa Pankoke, Bielefeld, Fed. Rep. of Germany

[73] Assignee: Firma Theodor Hymmen, Bielefeld, Fed. Rep. of Germany

[21] Appl. No.: 402,345

[22] Filed: Sep. 27, 1989

Related U.S. Application Data

[63] Continuation of Ser. No. 238,999, Aug. 29, 1988, Pat. No. 4,903,400, which is a continuation of Ser. No. 943,668, Dec. 18, 1986, abandoned.

[30] Foreign Application Priority Data

Dec. 21, 1985 [DE] Fed. Rep. of Germany ....... 3545744

[51] Int. Cl.$^5$ .............................................. B44B 5/02
[52] U.S. Cl. ..................................................... 72/184
[58] Field of Search .................. 72/184, 190; 264/112, 264/113

[56] References Cited

U.S. PATENT DOCUMENTS

| | | | |
|---|---|---|---|
| 524,746 | 8/1894 | Weber | 264/113 |
| 1,864,626 | 6/1932 | Arentsen | 264/112 |
| 2,438,089 | 3/1948 | Carson | 53/410 |
| 3,078,510 | 2/1963 | Rowe | 264/112 |
| 3,652,317 | 3/1972 | Porta et al. | 29/423 |

Primary Examiner—Lowell A. Larson
Attorney, Agent, or Firm—Laubscher, Presta and Laubscher

[57] ABSTRACT

A method of producing an embossed structure on a workpiece includes applying texturizing components to a carrier surface of a pressing member and causing the texturizing components to form the embossed structure on the workpiece by pressing the pressing member and the workpiece against one another with the carrier surface facing the workpiece. The texturizing components may be connected to the pressing member by gluing, soldering or welding. An apparatus for performing this method includes two pressing belts which are being pressed against the workpiece passing therebetween, at least one of such belts being provided with the texturizing components at an outer surface thereof by an applicator apparatus arranged upstream of the location at which the belts come into contact with the workpiece. The texturizing components may be removed from the belt after each or after several embossing operations.

1 Claim, 7 Drawing Sheets

METHOD OF AND APPARATUS FOR TEXTURIZING WORKPIECES

This application is a continuation of application Ser. No. 238,999 filed Aug. 29, 1988 now U.S. Pat. No. 4,903,400 granted Feb. 27, 1990 which was a continuation of application Ser. No. 943,668 filed Dec. 18, 1986, now abandoned.

BACKGROUND OF THE INVENTION

The present invention relates to texturizing outer surfaces of workpieces in general, and more particularly to a method of and an apparatus for embossing such outer surfaces with embossing patterns.

There are already known various arrangements for providing pressed, glossy or embossed texture on pressed metal sheets, punches, rollers, belts, foils or the like. So, for instance, there are already known double band presses which apply surface impressions to advancing plate-shaped workpieces by means of endless pressing belts.

By using such a double belt press, it is, for instance, possible to coat a workpiece with a foil. In this case, the pressing belts, which are constructed as steel belts, have a correspondingly prepared surface which either is provided with texturizing portions or is smooth, depending on whether the outer surface of the workpiece is to be texturized or smooth.

Consequently, depending on the respective application or needs, there are to be used correspondingly constructed and configured belts, inasmuch as there are presently available only pressing belts which are provided either with an embossed surface or with a smooth surface. Naturally, a belt exchange is relatively time-consuming and thus rather expensive so that, in the final analysis, it makes sense from the economical point of view to utilize this approach only when substantial lot sizes are to be produced with one pressing band type. Therefore, desires and requirements of consumers with respect to the configuration and texture of the surfaces of the workpieces can be taken into consideration only to an insufficient extent.

A further important disadvantage of the above approach is the currently existing need for the expensive and costly keeping of a stock of pressing belts, inasmuch as separate belts have to be available for each different texturization of the workpiece surfaces. Especially in view of the fact that the textures or reliefs of the workpiece surfaces are to a certain extent subject to fashion demands, the life span of the corresponding pressing belts cannot be fully utilized in many instances. This also contributes to relatively low efficiency and economy of the heretofore known texturizing processes.

As a sum total of the aforementioned disadvantages, there is obtained the result that the desirable design freedom with respect to the configurations of the pressing belts is not possible in an economically supportable framework.

The same is obviously also true when, instead of the pressing belts which then act as embossing belts, pressing metal sheets, pressing punches, pressing rollers or pressing foils are being employed for the texturizing of workpiece surfaces. In this connection, the above-discussed problems also exist during the fabrication of an embossed, a pressed or a glossy texture.

SUMMARY OF THE INVENTION

Accordingly, it is a general object of the present invention to avoid the disadvantages of the prior art.

More particularly, it is an object of the present invention to provide a method of embossing workpieces, which does not possess the drawbacks of the known methods of this type.

Still another object of the present invention is to devise a method of the type here under consideration which would render it possible to apply a multitude of different texturizing patterns to the workpiece while using one and the same pressing member.

It is yet another object of the present invention to develop the above method in such a manner as to significantly improve its economy relative to that obtained when using prior art methods.

A concomitant object of the present invention is to design an arrangement for performing the above method.

An additional object of the present invention is so to construct the arrangement of the above type as to be relatively simple in construction, inexpensive to manufacture, easy to use, and yet reliable in operation.

In keeping with these objects and others which will become apparent hereafter, one feature of the present invention resides in a method of producing an embossed structure on a workpiece, this method comprising the steps of applying texturizing components to a carrier surface of a pressing member; and causing the texturizing components to form the embossed structure on the workpiece by pressing the pressing member and the workpiece against one another with the carrier surface facing the workpiece.

The method of the present invention brings about a multitude of important advantages. So, for instance, it is now possible to apply many different texturizing components in a rapid succession to a single carrier surface, for instance, that of a pressing belt, without having to exchange respective carriers or pressing members in correspondence with varying desired texturizations.

Besides the fact that the utilization of the method of the present invention results in rendering the previously existing need for keeping a considerable number of different carriers or pressing members in stock superfluous, which naturally means that considerable savings are achieved, it is also no longer necessary to perform carrier or pressing member replacement, inasmuch as the application of the texturizing components to the corresponding carrier surface of the pressing member takes place directly in the press, so that a continuous operation of the press is interrupted only for a very short period of time which is needed for the application of the texturizing components to the carrier surface.

In accordance with an advantageous feature of the present invention, the texturizing components are removed from the carrier surface after the completion of the texturizing operation, that is, after the manufacture of a certain lot size of texturized workpieces or, for instance, after each revolution of the pressing belt, in such a manner that either a new texturizing pattern can be applied to the carrier surface, or that the carrier surface is used in its smooth state for treating the workpieces, for instance, during the use of the double belt press for the coating of particle boards or the like.

According to the present invention, the texturing components are constituted by parts which are made of one of synthetic plastic material, of metal such as copper, of fiber-reinforced synthetic plastic materials, of compound materials such as synthetic plastic material/metal compounds, or of an electrically conductive synthetic plastic material. The parts which constitute the texturizing components may as well consist of one of silicon acrylate and epoxide acrylate.

Herein, the applying step may advantageously include connecting the texturizing components to the carrier surface by one of heating, gluing, soldering, welding, hardening such as by heat of the pressing member, by hot air, or by infrared, ultraviolet, laser or electron beams, or by radioactive rays. A connection can also be achieved by the employment of microwaves. Moreover, the texturizing components can be affixed to or released from the carrier or pressing member by using electromagnetic forces. A further development of the present invention resides in the provision of the texturizing components with microencapsulated adhesives, which are situated at the surfaces which come into contact with the carrier surface and which are activated in a known manner during the application of the texturizing components to the carrier surface, such as by gluing by a two-component adhesive whose one component is contained in pressure or heat sensitive microcapsules.

The aforementioned removal of the texturizing components may be performed mechanically, such as by scraping or abrading, thermally, chemically or electromagnetically. So, for instance, the removal can be achieved by heating to such an extent tent that the adhesive or the material or the weld is overheated, so that the connection is terminated. However, even chemical processes are usable for the release of the texturizing components, such processes involving, for instance, overhardening of the connecting locations which are so influenced thereby that the connection is discontinued.

The present invention further provides for the applying step to be performed immediately prior to the causing step. In this manner, it is achieved that the texturizing process may be commenced, for all intents and purposes, immediately after the commencement of the application of the texturizing components to the carrier surface, so that there are achieved the shortest possible interruptions in the manufacturing process. It is also possible to monitor the texturized pattern for the occurrence of possible defects and to take immediate measures for remedying this situation, these measures taking place so early in the texturizing process that the damaged pattern can be repaired or reconstituted during the texturizing operation. The economical advantages which result therefrom are self-evident, since an interruption in the operation of the press for the purpose of repairing the texturizing pattern becomes superfluous and any requisite repairs can be performed on the carrier or pressing member without interrupting the operation.

Advantageously, the applying step includes attach the texturizing components to the carrier surface, and the causing step includes transferring and permanently connecting the texturizing components to a surface of the workpiece. In this manner, surface effects can be produced on the workpieces in a continuous passage process, inasmuch as the structure components can be newly formed on the corresponding carrier surface immediately after the transfer of the preceding texturizing components to the workpiece surface.

In order to be able to produce sufficient lot sizes of texturized workpieces by using the texturizing components which have been originally applied to the carrier surface, there may advantageously be further used the step of coating the texturizing components immediately following the applying step and prior to the causing step with a coating layer which may advantageously be of a lacquer, so as to increase the durability of the texturizing components to such an extent that the desired lot size can be fabricated without any need for reworking or reapplying the texturizing components.

According to another advantageous aspect of the present invention, the applying step includes depositing a layer of a metal, metal alloy, synthetic plastic material or compounds thereof on the carrier surface of the pressing member, and forming the texturizing components in the deposited layer. It is advantageous when the applying step further includes heating the deposited layer prior to the forming step, and cooling the deposited layer subsequent to the forming step and prior to the causing step. There may advantageously be used the step of liquefying the deposited layer subsequent to the causing step by heating the same for a short period of time to remove the texturizing components therefrom.

The present invention is also directed to an arrangement for producing an embossed structure on a workpiece in accordance with the method of the present invention. This arrangement includes a pressing member having a carrier surface; means for applying texturizing components to the carrier surface of the pressing member; and means for causing the texturizing components to form the embossed structure on the workpiece by pressing said pressing member and the workpiece against one another with said carrier surface facing the workpiece. Advantageously, the applying means includes an automatic applicator apparatus, and computer means connected to the applicator apparatus and operative for controlling the same. Herein, the texturizing pattern is inputted into the computer means and is subsequently transmitted by the computer means to the applicator apparatus for a corresponding application of the texturizing components.

Owing to the use of this construction of the applying means, the variation possibilities during the formation of the texturizing pattern are, for all intents and purposes, unlimited. Various kinds of motifs can be produced; herein, besides the possibility of storing predetermined patterns retrieving such stored patterns as desired, it is also possible to directly input the desired pattern into the computer means. Thus, it is possible to produce individual embossments, also of relatively small lot sizes, without any additional expenditures and thus without any additional costs.

According to an advantageous facet of the present invention, the applicator apparatus is constructed as an oscillating applicator apparatus. In this case, the computer means advantageously includes means for changing the arrangement of the texturizing components in dependence on computer programs, the operating speed of the applicator apparatus, and the speed of movement of the pressing member. Thus, when the pressing member is constituted by a pressing belt and the texturizing components are applied thereto during continued operation of the pressing belt, the arrangement of the texturizing components on the carrier surface of the pressing belt occurs in synchronism with the advancement of the pressing belt. Herein, the operating speed of the applicator apparatus as well as the advancement speed of the pressing belt are the basic values on which the computer means determines the arrangement or distribution of the texturizing components. Advantageously, the computer means includes means for synchronizing the arrangement of the texturizing components in correspondence with the length and the width of the workpiece. It is further advantageous when the embossing arrangement includes means for sensing patterns provided on the surface of the workpiece to be embossed, and when the computer means includes means for providing an arrangement of the texturizing components which is synchronous to such patterns.

Advantageously, the applicator apparatus includes a screen templet. The screen templet may be constituted by a screen printing cylinder. The applicator apparatus is advantageously constructed as a laser printer. However, the applicator apparatus may also be constructed as a pressing roller. The pressing member may have a metallic layer at its carrier surface and the applicator apparatus may be operative for embossing the texturizing components into the metallic layer. Then, the applying means further comprises heating means including an emitter for heating said metallic layer prior to the embossing of said texturizing components thereinto, and means for cooling said applicator apparatus. The texturizing components may consist of a substance which reacts with the workpiece under pressure and heat to form texturization on the workpiece.

Aside of already mentioned possibility of producing a multitude of different patterns by resorting to the use of the method of the present invention, with simultaneous achievement of enormous savings, even the arrangement according to the invention offers similar advantages, inasmuch as the formation of a texturizing pattern by the applicator apparatus is accomplished automatically and the entry of the desired texturizing pattern into the computer means can be performed, under certain circumstances, by personnel not possessing a high level of skill.

The advantages of the method in accordance with the present invention and of the corresponding arrangement can be recognized to the fullest extent only when they are compared with the currently used very complicated and expensive methods and arrangements.

The present invention also presents a solution to a further problem which upto now exerted a deleterious influence on the manufacturing process. Namely, a critical region, especially in pressing belts which were provided with texturizing formations or portions was the seam location at which the beginning and the end portion of the texturizing formations or portions came together. An exact or even seamless transition at this region was possible, if at all, only by resorting to very complicated and expensive operations.

When the texturizing components are applied in accordance with the method of the present invention and by means of the arrangement of the present invention, this problem is no longer present, inasmuch as the texturizing component applicator apparatus is controllable by the computer means in such a manner that a seamless transition is achievable without encountering any difficulties or is not necessary when the texturizing components are being continuously applied and removed.

BRIEF DESCRIPTION OF THE DRAWING

The present invention will be described below in more detail with reference to the accompanying drawing in which.

DETAILED DESCRIPTION OF THE PREFERRED EMBODIMENT

Referring now to the drawing in detail, it may be seen that FIGS. 1 to 6 and 8 to 10 thereof are diagrammatic illustrations of a double belt press which includes, among others, two mutually oppositely located circulating endless belts 1 and 2 which are pressable against a workpiece 3.

The workpiece 3 may be constituted, for instance, by a wood plate, particle board or the like. The pressing belts 1 and 2 can herein be used for the pressing of the workpiece 3 as well as for the application of a texturization to at least one major surface of the workpiece 3.

To this end, the pressing belt 3, which constitutes a carrier, is provided with an embossing pattern 7 which impresses its configuration into the respective major surface during the advancement of the article 3 between the pressing belts 1 and 2.

Herein, the workpiece 3 is transported or advanced by the pressing conveyors 1 and 2 which are pressed against it in the direction indicated by an arrow.

Figure 1:
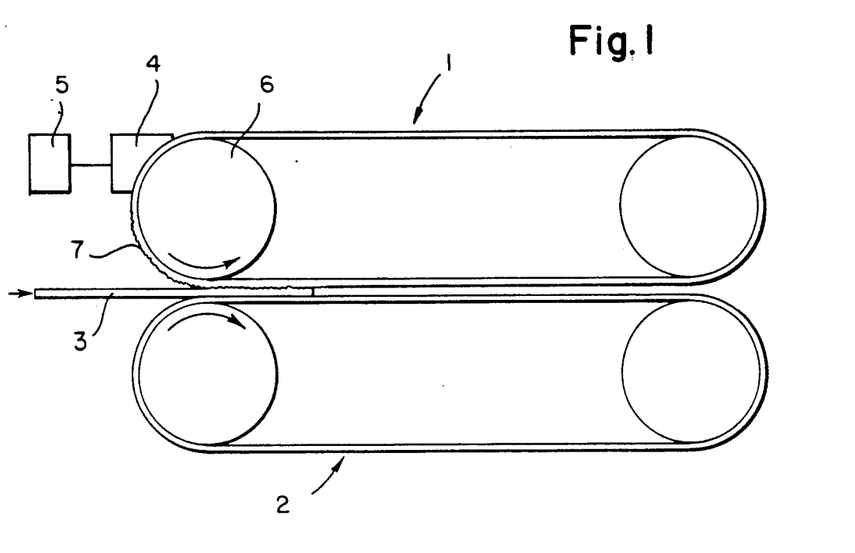
FIGS. 1 to 12 are diagrammatic simplified representations of an arrangement of the present invention and of its details and modifications during various phases of the performance of the method of the present invention.

Upwardly of the operating range of the pressing belt 1, and immediately adjacent one reversing roller 6, which can also be used as the driving roller, there is arranged an applicator apparatus 4 which is connected with a computer 5. As indicated in FIG. 1, the embossing pattern 7 which is predetermined by the computer 5 is applied by the applicator apparatus 4 to the pressing belt 1 at a carrier surface thereof which is to come into contact with the workpiece 3. Advantageously, the embossing pattern 7 is constituted by a plurality of texturizing components which are arranged next to one another and which are anchored in the carrier surface of the pressing belt 1. Herein, the embossing pattern 7 is so configured as to be grid-shaped and elevated.

Figure 2:
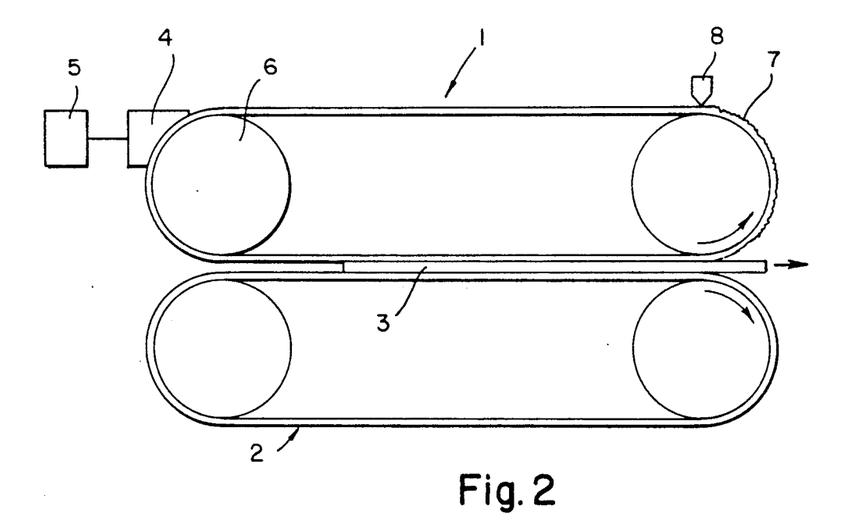

FIG. 2 shows a further step of the method according to the present invention, which involves the removal of the texturizing components from the carrier surface of the pressing belt 1 after the completion of the texturizing or embossing step or operation by means of a stripper 8. Subsequently to such removal, the carrier surface of the pressing belt 1 can be provided with a new embossing pattern 7, or it can be used without any embossing pattern 7 in its smooth condition for the treatment of other workpieces 3.

In principle, when using a double belt press, either the carrier surfaces of both of the pressing belts 1 and 2, or selectively one but not the other of such carrier surfaces, can be provided with the aforementioned texturizing components.

Figure 3:
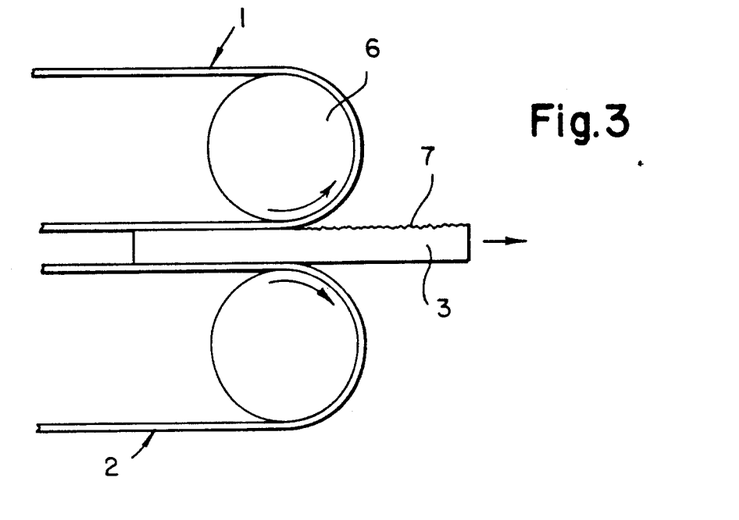

It is shown in FIG. 3 of the drawing how the texturizing components of the embossing pattern 7 are transferred, after their application to the carrier surface of the pressing belt 1, to the workpiece 3 and connected with the workpiece 3.

Figure 4:
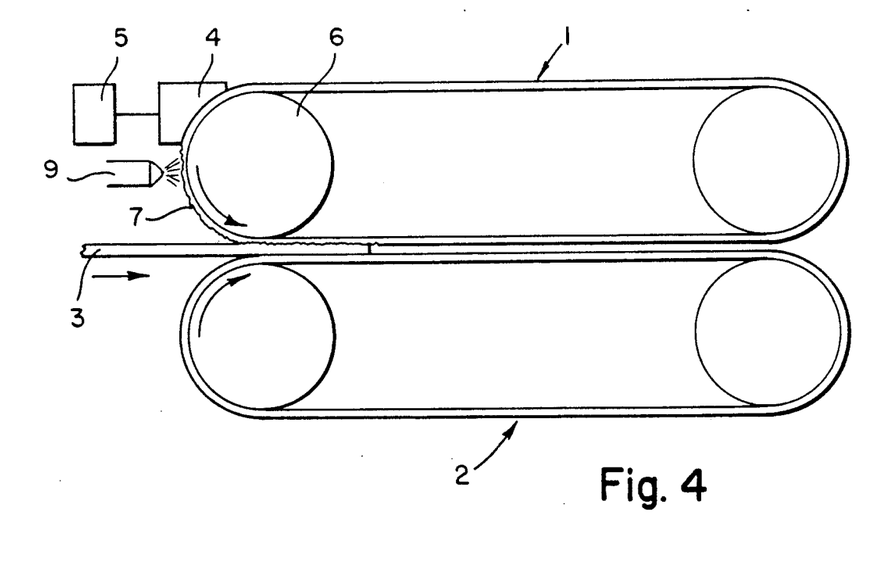

A further advantageous embodiment of the invention is illustrated in FIG. 4 of the drawing. Herein, the texturizing components of the embossing pattern 7 are covered by a layer of lacquer immediately after their application to the carrier surface of the pressing belt 1. Herein, a spraying nozzle 9 is arranged between the workpieces 3 and the applicator apparatus 4 and is operative for applying the lacquer to the texturizing components of the embossing pattern.

Figure 5:
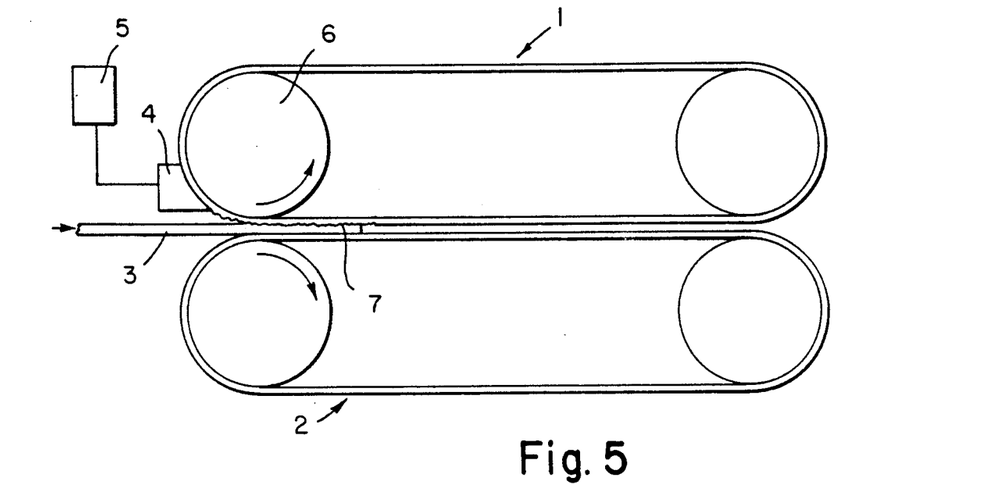

In a double belt press which is illustrated in FIG. 5 of the drawing, the applicator apparatus 4 is arranged at the pressing belt 1 in the immediate vicinity of the workpiece 3. As a result of this arrangement, the texturizing components of the embossing pattern 7 can be applied to the carrier surface of the pressing belt 1 which faces the workpiece 3 immediately prior to the embossing operation.

Figure 6:
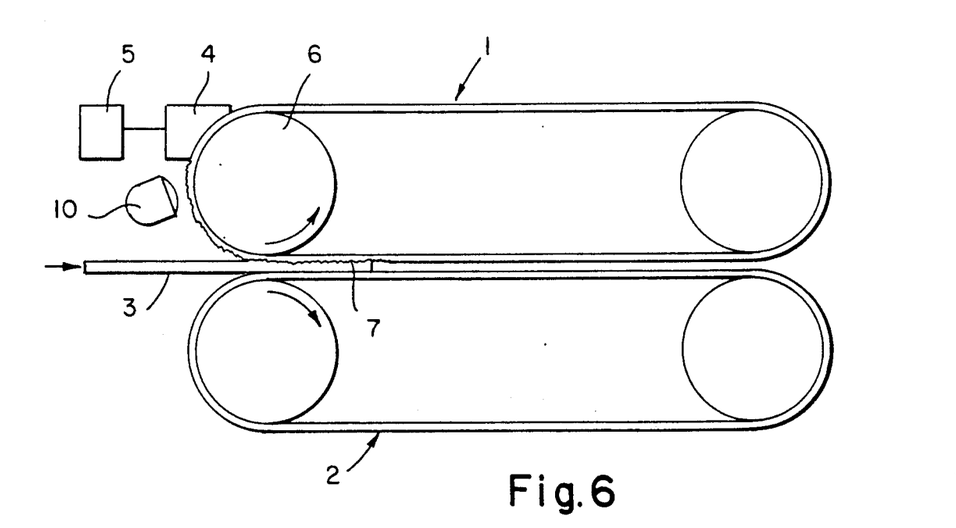

One possibility for connecting the texturizing components of the embossing pattern 7 with the carrier surface of the pressing belt 1 is illustrated in FIG. 6 of the drawing. Herein, an emitter 10 is arranged downstream of the applicator apparatus 4. The emitter 10 is operative for emitting either hot air, or infrared, ultraviolet, laser or electron beams, or radioactive rays, or microwaves to effect the connection of the texturizing components of the embossing pattern 7 with the carrier surface of the pressing belt 1 by heating, gluing, soldering, welding or hardening.

Figure 7:
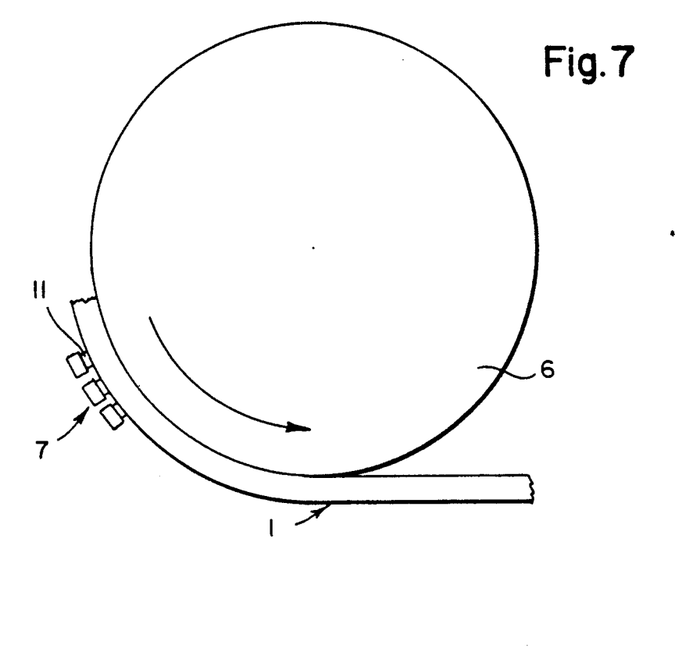

A further possibility of connecting the embossing pattern 7 with the pressing belt 1 is illustrated in FIG. 7 of the drawing. Preferably, the texturizing components of the embossing pattern 7 are here connected with the carrier surface of the pressing belt 1 by means of a two-component adhesive, wherein at least one of the components of the adhesive is contained in pressure or temperature sensitive microcapsules 11.

Figure 8:
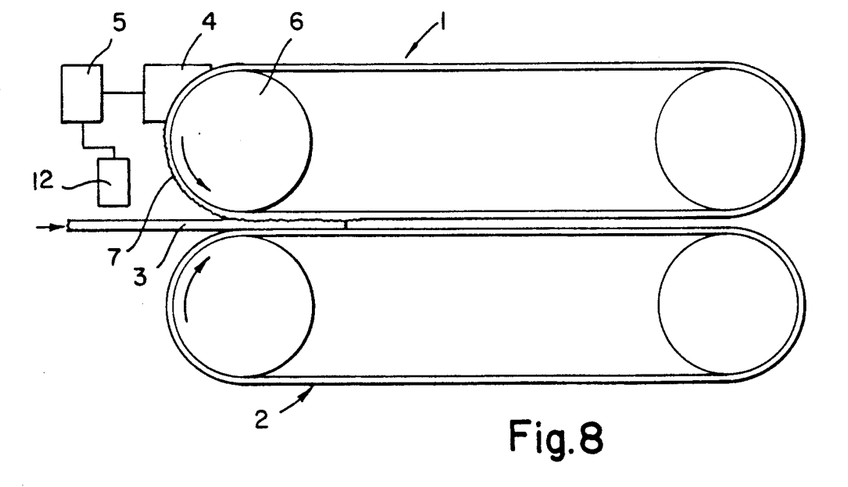

As may be ascertained from FIG. 8 of the drawing, a printed or other pattern which is already present at the corresponding major surface of the workpiece 3 may be sensed by means of a reading head 12 which is coupled with the computer 5, and the corresponding information can be so processed by the computer 5 that there is obtained a synchronous control of the applicator applicator apparatus 4, by means of which the configuration and distribution of the texturizing components of the embossing pattern 7 can be determined and the thus ascertained printed or other pattern of the workpiece 3 is applied to the carrier surface of the pressing belt 1.

Figure 9:
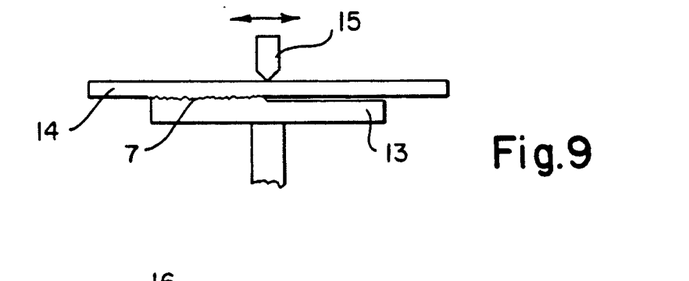
Figure 10:
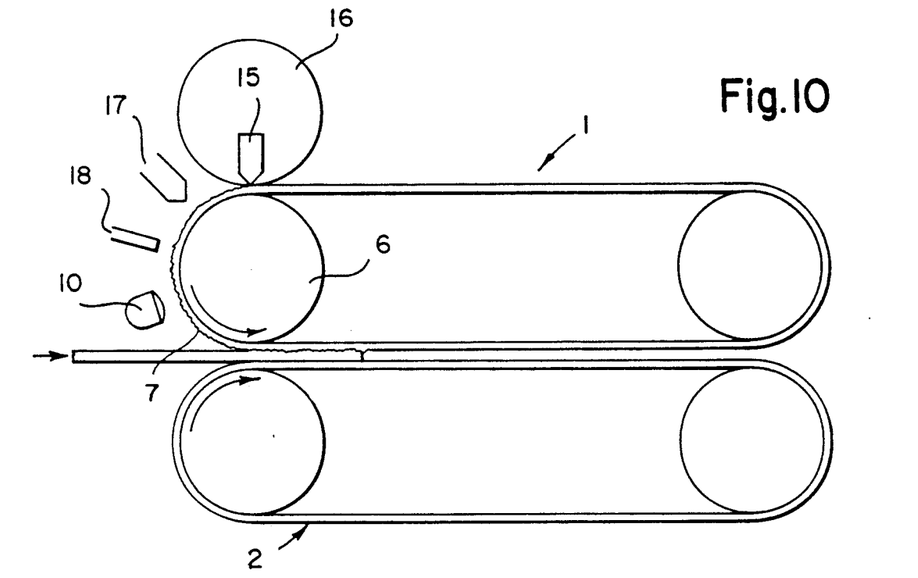

A further example of the embodiment of the invention is depicted in FIGS. 9 and 10 of the drawing. As shown there, the applicator apparatus 4 is provided with a screen template 14 which, in accordance with the construction illustrated in FIG. 10, is constructed as a screen printing cylinder 16.

In the exemplary embodiment shown in FIG. 9, a carrier 13 is configured as a flat even plate which can be, for instance, a constituent element of a pressing punch. Herein, as well as in the exemplary construction depicted in FIG. 10, an adhesive is applied by means of a doctor blade 15 through the screen templet 14 or the screen printing cylinder 16 to the carrier surface, so that there is obtained an adhesive matrix, to which there is subsequently applied, by means of a dust applicator 17, a wear-resistant dust or powder. A cleaning arrangement 18 is arranged downstream of the dust applicator 17 and is operative for removing, for instance, excess powder particles which may have accumulated outside the contour of the adhesive matrix. For the hardening of the thus formed texturizing components of the embossing matrix 7, such texturizing components are hardened after the application of the powder by application of heat thereto, so that there is obtained a solid connection between the powder particles and the adhesive matrix, this solid connection assuring a sufficient rigidity of the thus obtained texturizing components of the embossing pattern 7.

Beside the above-discussed possibility of applying an adhesive matrix to the carrier surface through a screen templet 14 or through a screen printing cylinder 16, there also exists the possibility to produce the adhesive matrix with the aid of a laser printer or an ink jet printer. It is also possible to initially apply the texturizing components of the embossing pattern 7 to the carrier surface by means of a printer of a corresponding construction in the form of a powder pattern and to subsequently sinter the thus applied powder.

Figure 11:
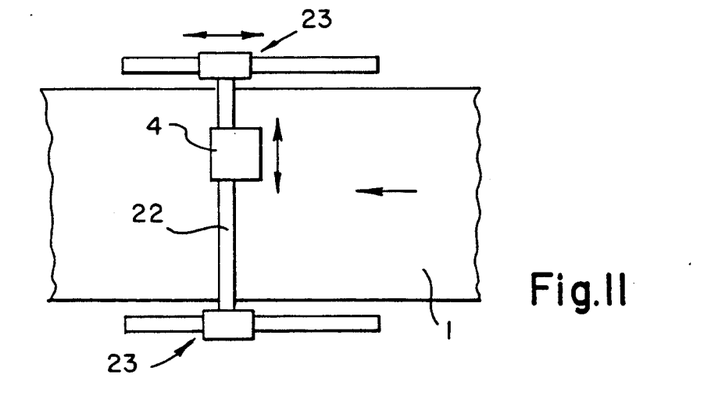

An oscillating applicator apparatus 4 is illustrated in FIG. 11 of the drawing. In this instance, the applicator apparatus is mounted for movement transversely to the advancement direction of the pressing belt 1 on a guiding rod 22. The guiding rod 22 is, in turn, mounted at the respective sides of the pressing belt 1 in respective guiding arrangements 23 for displacement in the longitudinal direction of the pressing belt 1. As a result of this construction, there is obtained the possibility, in cooperation with the advancement speed of the pressing belt 1, of applying computer-controlled patterns 7 to the carrier surface of the pressing belt 1.

Figure 12:
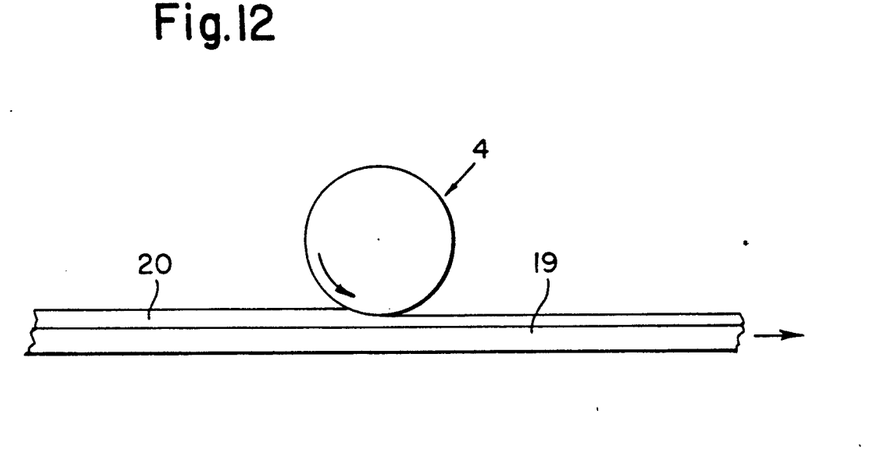
Figure 13:
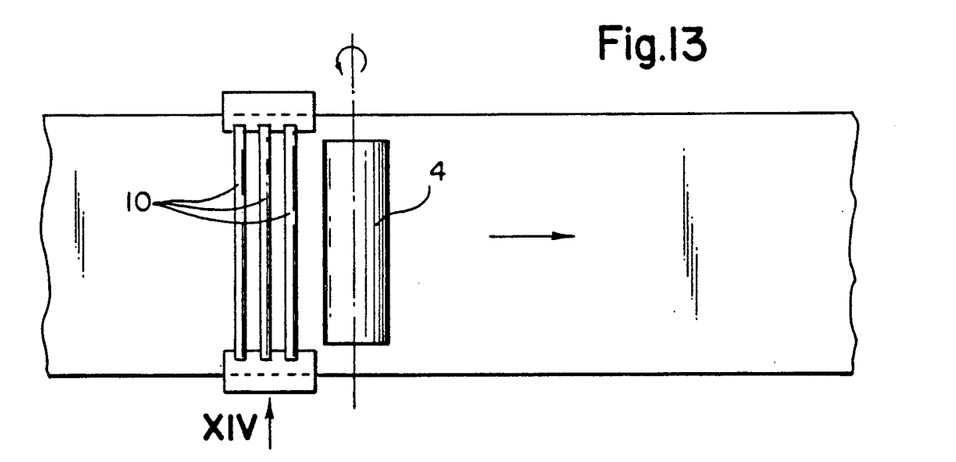
FIG. 13 is a top plan view of an arrangement of the present invention.
Figure 14:
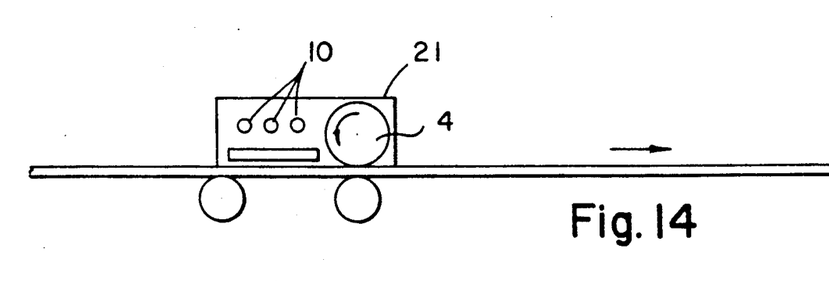
FIG. 14 is a side elevational view taken in the direction of an arrow XIV in FIG. 13.

A further embodiment of the method according to the invention is illustrated in FIGS. 12 to 14 of the drawing. Herein, a layer 20 of a low-temperature melting metal or of a metal alloy, such as, for instance, a zinc-lead alloy, of a synthetic plastic material or of a metal/synthetic plastic material compound is connected with a carrier 19. The thickness of the applied metallic layer 20 corresponds at least to the height of the texturizing components to be produced. Such texturizing components are initially embossed into the layer 20. During this operation, the layer 20 can be either rigid or made deformable by partial heating, preferably up to a dough-like consistency. The partial heating of the layer 20 is herein accomplished by means of the emitter 10.

In the event of the heating of the layer 20, the fabrication of the texturizing components is accomplished by a cooled applicator apparatus 4 which, in the exemplary embodiment here under consideration, is constructed as a texturizing roller. In this manner, it is achieved that the material of the layer 20 is converted during the production of the texturizing components into a rigid aggregate condition, so that the texturizing components obtain the rigidity which is required for their function.

For the release of the texturizing components, it is proposed in accordance with the present invention to liquefy the material of the layer 20 after the texturizing components have contacted the workpiece 3 by heating such material for a short period of time, so that the layer 20 obtains a smooth surface, to which new texturizing components may be applied.

Inasmuch as the molten metal possesses a strong affinity to oxygen, which results in undesired formation of oxides, the heating of the layer 20 may be advantageously performed in an inert atmosphere. To this end, there is provided a casing 21 which bounds a space that is sealed with respect to the ambient atmosphere. An inert atmosphere is produced at a slightly superatmospheric pressure in the interior of the casing 21. The emitter 10 and the applicator apparatus 4 are accommodated in the internal space of the casing 21.

In order to prevent the liquefied metal from escaping laterally, the edges of the layer 20 are protected, for instance by a water-cooled mask or by a corresponding arrangement of the emitter 10, from the heating effect of the emitter 10.

Figure 15:
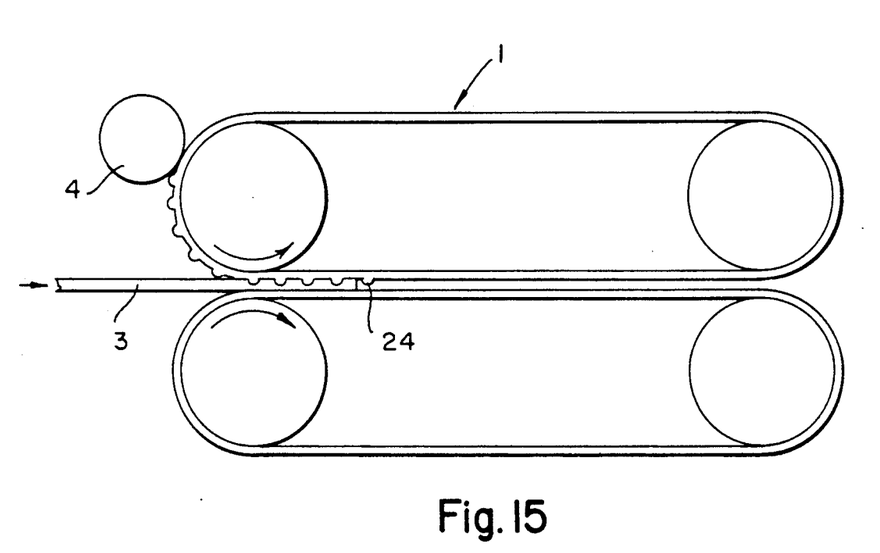
FIG. 15 is a diagrammatic side elevational view of a further modification of the arrangement of the present invention.

A further example of the embodiment of an arrangement for performing the method of the present invention is shown in FIG. 15 of the drawing. In this case, a substance is applied to the pressing belt 1 in the form of a pattern by means of the applicator apparatus 4 which in this instance is constructed as a pressing roller. This substance releases a gas, after the pressing belt 1 has contacted the workpiece 3, under the influence of pressure and heat. The released gas then produces a texturization 24 on the corresponding surface of the workpiece 3, owing to the volume increase.

While the present invention has been described and illustrated herein as embodied in a specific construction of a double pressing belt arrangement, it is not limited to the details of this particular construction, since various modifications and structural changes are possible and contemplated by the present invention. Thus, the scope of the present invention will be determined exclusively by the appended claims.

What is claimed is:

1. A method of producing a textured surface on a planar workpiece, comprising the steps of
   (a) driving a spaced pair of opposed endless belts of a double-belt pressing mechanism, the opposed portions of said belts being driven in the same direction;
   (b) applying raised textured components onto the outer surface of at least one of said driven belts;
   (c) passing a workpiece between the opposed portions of said belts, said textured components on said one belt surface contacting a surface of the workpiece;
   (d) pressing said endless belts together to press said textured components against said workpiece surface in order to imprint a pattern in said workpieces surface in accordance with said textured components; and
   (e) removing said components from said pressing mechanism outer surfaces following at least one contact of the workpiece with said components of said pressing mechanism outer surface.

* * * * *